2 Sheets—Sheet 1

W. B. KILLOUGH.
CULTIVATOR AND CHOPPER.

No. 184,783. Patented Nov. 28, 1876.

WITNESSES:
A. W. Almqvist
A. F. Roberts

INVENTOR:
W. B. Killough
BY
ATTORNEYS.

2 Sheets—Sheet 2.
W. B. KILLOUGH.
CULTIVATOR AND CHOPPER.
No. 184,783. Patented Nov. 28, 1876.
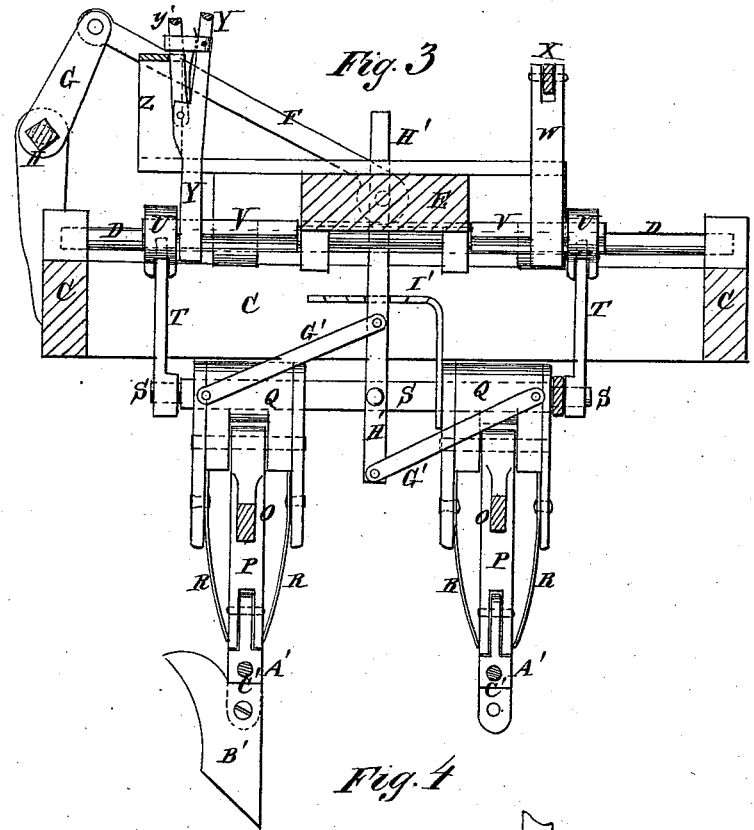
Fig. 3
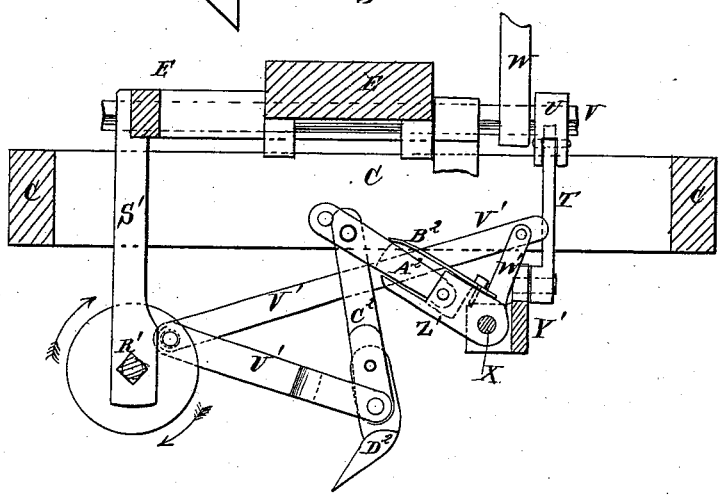
Fig. 4
Fig. 5
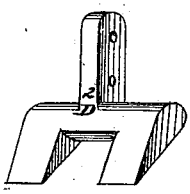
WITNESSES:
A. W. Almquist
Alex F. Roberts
INVENTOR:
W. B. Killough
BY
ATTORNEYS.

UNITED STATES PATENT OFFICE.

WILLIAM B. KILLOUGH, OF LARISSA, TEXAS.

IMPROVEMENT IN CULTIVATOR AND CHOPPER.

Specification forming part of Letters Patent No. 184,783, dated November 28, 1876; application filed October 7, 1876.

*To all whom it may concern:*

Figure 1:
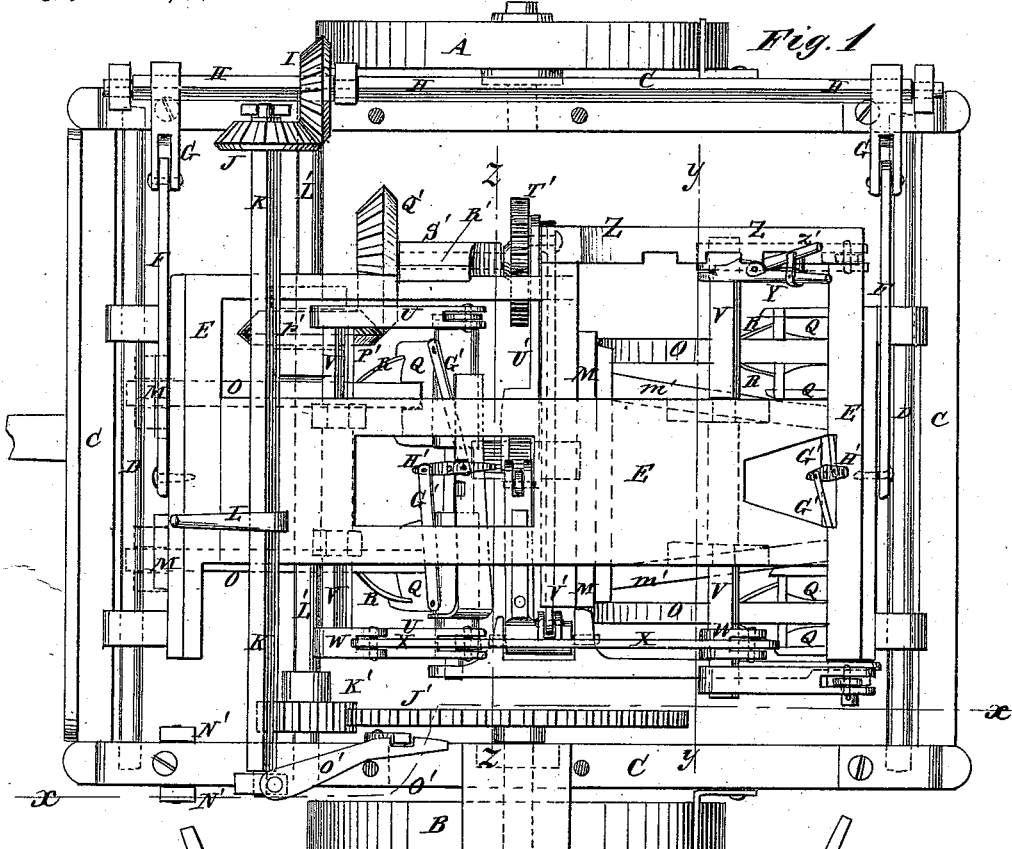
Figure 2:
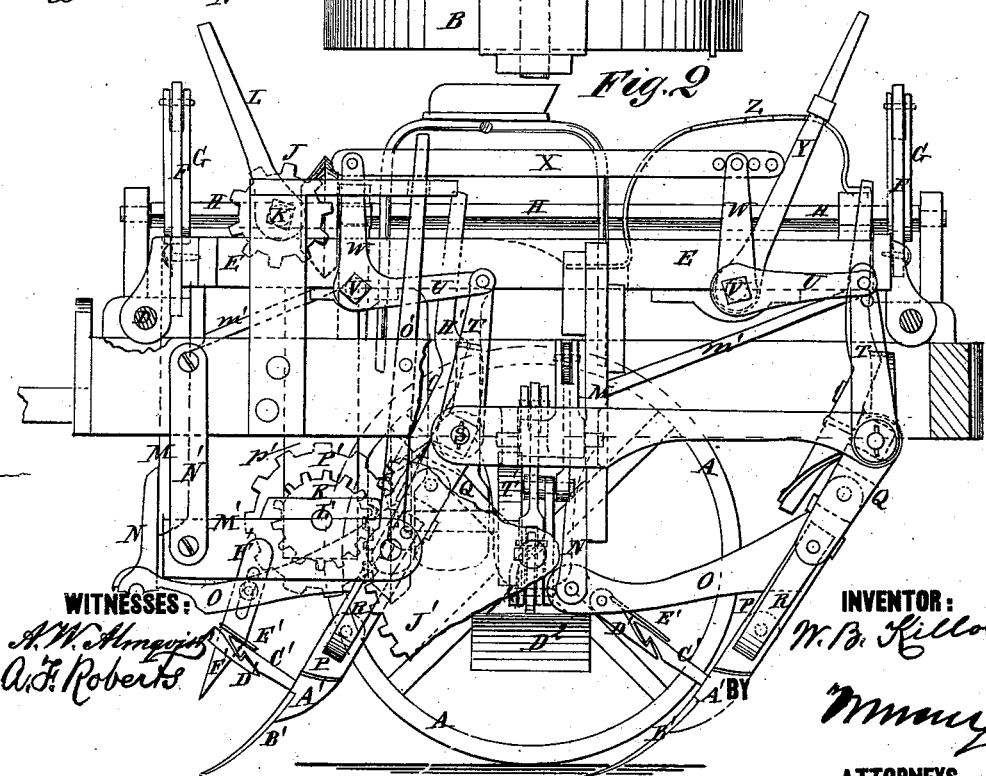

Be it known that I, WILLIAM B. KILLOUGH, of Larissa, in the county of Cherokee and State of Texas, have invented a new and useful Improvement in Combined Cultivator and Chopper, of which the following is a specification:

Figure 1, Sheet 1, is a top view of my improved machine. Fig. 2, Sheet 1, is a side view of the same, partly in section, through the line $x\,x$, Fig. 1. Fig. 3, Sheet 2, is a detail vertical section taken through the line $y\,y$, Fig. 1. Fig. 4, Sheet 2, is a detail vertical section taken through the line $z\,z$, Fig. 1. Fig. 5, Sheet 2, is a detail perspective view of a modified form of the chopping-hoe.

Similar letters of reference indicate corresponding parts.

The object of this invention is to furnish an improved cultivator and chopper which shall be so constructed that the plows may be conveniently raised from and lowered to the ground, adjusted to work at any desired distance apart, and at any desired depth in the ground, which will enable the plows to be moved laterally in guiding the machine, and which will allow the plows and chopping-hoe to yield should they strike an obstruction, to prevent the machine from being broken.

The invention consists in the combination of the wheels, the stationary wheels, the rods, and the sliding frame with each other, to receive and support the operating mechanism of the machine; in the combination of the pivoted bars, the arms, the shaft, the bevel-gear wheels, the shaft, and the lever with the stationary frame and the sliding frame, for guiding and controlling the plows; in the combination of the hangers, the adjustable blocks, the plow-beams, the plow-standards, the plow-feet, the slotted sliding blocks, the springs, the shafts, the two sets of arms, the shafts, the arms, the connecting-rod, the lever, and the catch-bar with each other, and with the sliding frame; in the combination of the hook-bars and the springs with the pivoted plow-feet and the plow-beams; in the combination of the pivoted bars, the pivoted lever, and the catch-bar with the blocks to which the plow-standards are pivoted, and with the shaft upon which said blocks slide; and in the combination of the gear-wheels, the shaft, the bevel-gear wheels, the shaft, the crank-wheel, the two connecting-bars, the two crank-arms and shaft, the spring, the connecting-bar, the standard, and the hoe, with the bar attached to the shafts that carry the sliding blocks, the sliding frame, the slotted hanger, the stationary frame, and the revolving axle of the wheel, as hereinafter fully described.

A and B are the wheels upon which the machine is carried. The wheel A revolves upon a short axle secured to a hanger attached to the side bar of the frame C. The wheel B is rigidly attached to a short axle, which revolves in bearings in hangers attached to the frame C.

The frame C consists of two side bars, connected at their ends by two cross-bars. To the front and rear corners of the frame C are secured the ends of two cross-rods, D, upon which slide bearings attached to the front and rear ends of the frame E. The frame E is made narrower than the frame C, so as to have a lateral movement within said frame C.

To the ends of the sliding frame E are pivoted the ends of two bars, F, the outer ends of which are pivoted to the ends of two arms, G, rigidly attached to the end parts of a rock-shaft, H, which works in studs attached to the side bar of the frame C, and to which is attached a bevel-gear wheel, I.

The teeth of the bevel-gear wheel I mesh into the teeth of a bevel-gear wheel, J, attached to the shaft K, which works in bearings attached to the frame C, and to which is attached the lever L, so that by operating the lever L the frame E and its attachments may be moved laterally, as required. To the frame E, at its forward end, and at a little distance in the rear of its center, are rigidly attached two pairs of hangers, M, the hangers of the rear pair being farther apart than those of the forward pair, so that the forward plows may work closer to the row of plants than the rear plows. The draft-strain upon the hangers M is sustained by the inclined braces $m'$, the rear ends of which are attached to the sliding frame E.

In the lower parts of the hangers M are formed a number of holes to receive the bolts by which the blocks N are secured to them, so that by adjusting the said blocks the points of draft attachment may be adjusted higher or lower, to cause the plows to work shallower or deeper in the ground, as may be desired. The lower ends of the blocks N are slotted, and in said slots are pivoted the forward ends of the plow-beams O, the rear ends of which are attached to the standards P. The upper ends of the standards P are pivoted in slots in the blocks Q, which slots are made a little wider than the upper ends of the standards P, so that the lower ends of the said standards may have a little lateral play.

To the sides of the blocks Q, or to bars attached to said sides, are attached two springs, R, the lower ends of which are curved inward and rest against the opposite sides of the lower part of the standards P.

The springs R are made strong enough to hold the standards in place under ordinary circumstances, but which will yield should the side of the plows strike an obstruction and allow the plows to pass around said obstruction. The blocks Q slide upon a square bar, S, to the ends of which are pivoted the lower ends of the connecting-rods T. The upper ends of the connecting-rods T are pivoted to the outer ends of the arms U, the inner ends of which are rigidly attached to the ends of two shafts, V, which work in bearings attached to the frame E. To one end of each of the shafts V is rigidly attached an arm, W. The upper ends of the two arms W are pivoted to the opposite ends of a connecting-bar, X. To the other end of one of the shafts V is rigidly attached a lever, Y, so that all the plows may be raised and lowered at the same time by operating the said lever Y.

The lever Y moves along an arched bar, Z, in which are formed notches to receive the spring-catch $y'$, attached to the said lever Y, to hold the plows in any position into which they may be adjusted.

The lower ends of the standards P are slotted to receive the tenons formed upon the upper ends of the plow-feet $A^1$, which are pivoted to said standards.

Upon the forward sides of the lower ends of the feet $A^1$ are formed seats for the plows $B^1$, which seats may be straight, or may be inclined to enable the plow to more readily turn the soil to one side.

To the feet $A^1$ are rigidly attached the rear ends of bars $C^1$, the lower side of the forward ends of which are beveled off, and have notches formed in them to fit upon the correspondingly-formed rear ends of the bars $D^1$. The forward ends of the bars $D^1$ are pivoted in slots in the lower sides of the forward parts of the plow-beams O, and to said bars $D^1$ are attached springs $E'$, which rest upon the upper sides of the forward ends of the bars $C^1$ and $D^1$. The said bars $C^1$ $D^1$ interlock with each other under ordinary circumstances; but should the plow strike an obstruction, the device $C^1$ $D^1$ $E'$ will give way and allow the plow-foot to turn back, to prevent the machine from being broken. $F'$ are bars which are attached to the beams O to fend or push off any trash that may be in the way of the plows, and which are slotted longitudinally to receive the bolts by which they are secured to said plow-beams, so that they may be adjusted to reach down to the ground, whether the plows may be working deep or shallow in the ground.

To the blocks Q of each pair of plows are pivoted the outer ends of two bars, $G'$, the inner ends of which are pivoted to a lever, $H'$, upon the opposite sides of and equally distant from the pivoting-point of said lever. The levers $H'$ are pivoted to the centers of the shafts S, and their upper parts move along notched bars $I'$, attached to one of the blocks Q, or to some other suitable support, and which hold the said levers in any position into which they may be adjusted. By this construction the plows of each pair may be adjusted to work at any desired distance apart.

To the inner end of the revolving axle of the wheel B is attached a large gear-wheel, $J'$, into the teeth of which mesh the teeth of the small gear-wheel $K'$, attached to the shaft $L'$. The end of the shaft $L'$ farthest from the gear-wheel $K'$ revolves in bearings in a hanger attached to the frame C. The other end of the shaft $L'$ revolves in bearings in a bar, $M'$, one end of which is pivoted to the lower end of bars $N'$, and its other end is pivoted to the lower end of the lever $O'$. The upper end of the bar $N'$ and the lever $O'$, at a distance from its lower end equal to the length of the said bar $N'$, are pivoted to the frame C, so that by operating the said lever $O'$, the end of the shaft $L'$ will be moved to throw the wheel $K'$ into and out of gear with the gear-wheel $J'$. The lever $O'$ is held in position by a catch-bar, $o'$, attached to the upper end of the standard that supports the end of the shaft K.

Upon the shaft $L'$ is placed a bevel-gear wheel, $P'$, the teeth of which mesh into the teeth of a bevel-gear wheel, $Q'$, attached to the end of a short shaft, $R'$. The shaft $R'$ revolves in bearings in a hanger, $S'$, attached to the frame E, and to its other end is attached a crank-wheel, $T'$. The gear-wheel $P'$ revolves in a slot in the lower end of a hanger, $p'$, attached to the frame E, to keep it in gear with the gear-wheel Q, connected with said frame E. To the crank-pin of the crank-wheel $T'$ are pivoted the ends of two bars, $U'$ $V'$. The other end of the bar $V'$ is pivoted to a crank-arm, $W'$, rigidly attached to a short shaft, $X'$. The shaft $X'$ works in bearings attached to a bar, $Y'$, the ends of which are attached to the ends of the shafts S, that carry the blocks Q, with which the plow-standards P are connected.

To the short shaft $X'$ is also rigidly attached a crank-arm, $Z'$, projecting at right angles, or nearly so, with the crank-arm $W'$. The crank-arm $Z'$ is made with a shoulder, to which is pivoted the end of a bar, $A^2$, the projecting part of said crank keeping the outer end of the bar A² from dropping down. The bar A² is held down upon the projecting part of the crank-arm Z', under ordinary circumstances, by the spring B², attached to said crank-arm; but should the hoe strike an obstruction, the spring B² will yield and allow the hoe to pass over the said obstruction without breaking the machine. To the end of the bar A² is pivoted the upper end of the standard C², the lower end of which is slotted to receive the shank of the hoe D². The shank of the hoe D² is secured to the standard by a bolt and a wooden pin, which wooden pin is designed to break and allow the hoe to swing back should the said hoe strike an obstruction. To the bolt that secures the hoe D² to the standard C² is pivoted the end of the connecting-bar U'. The hoe D² may be made of the width of the space desired to be left between the hills, as shown in Fig. 2, or its middle part may be cut away, as shown in Fig. 5.

By this construction, as the crank-wheel T' revolves, the hoe D² is drawn downward and forward to make a stroke, and is then pushed upward and backward to bring it into position for making another stroke, and to leave stalks for a hill.

Having thus described my invention, I claim as new and desire to secure by Letters Patent—

1. The combination of the wheels A B, the stationary frame C, the rods D, and the sliding frame E with each other, to receive and support the operating mechanism of the machine, substantially as herein shown and described.

2. The combination of the pivoted bars F, the arms G, the shaft H, the bevel-gear wheels I J, the shaft K, and the lever L with the stationary frame C and the sliding frame E, for guiding and controlling the plows, substantially as herein shown and described.

3. The combination of the hangers M, the adjustable blocks N, the plow-beams O, the plow-standards P, the plow-feet A¹, the slotted sliding blocks Q, the springs R, the shafts S, the arms T U, the shafts V, the arms W, the connecting-rod X, the lever Y y', and the catch-bar Z with each other, and with the sliding frame E, substantially as herein shown and described.

4. The combination of the notched bars C¹ D¹ and the springs E' with the pivoted plow-feet A¹ and the plow-beams O, substantially as herein shown and described.

5. The combination of the pivoted bars G', the pivoted lever H', and the catch-bar I' with the blocks Q, to which the plow-standards are pivoted, and with the shafts S, upon which said blocks Q slide, substantially as herein shown and described.

6. The combination of the gear-wheels J' K', the shaft L', the bevel-gear wheels P' Q', the shaft R', the crank-wheel T', the bars U' V', the crank-arms and shaft W' Z' X', the spring B², the connecting-bar A², the standard C², and the hoe D², with the bar attached to the shafts S, the sliding frame E, the slotted hanger p', the stationary frame C, and the revolving axle of the wheel B, substantially as herein shown and described.

WILLIAM BOYICAN KILLOUGH.

Witnesses:
O. E. McCARTY,
C. C. McCARTY.